Figure 1:
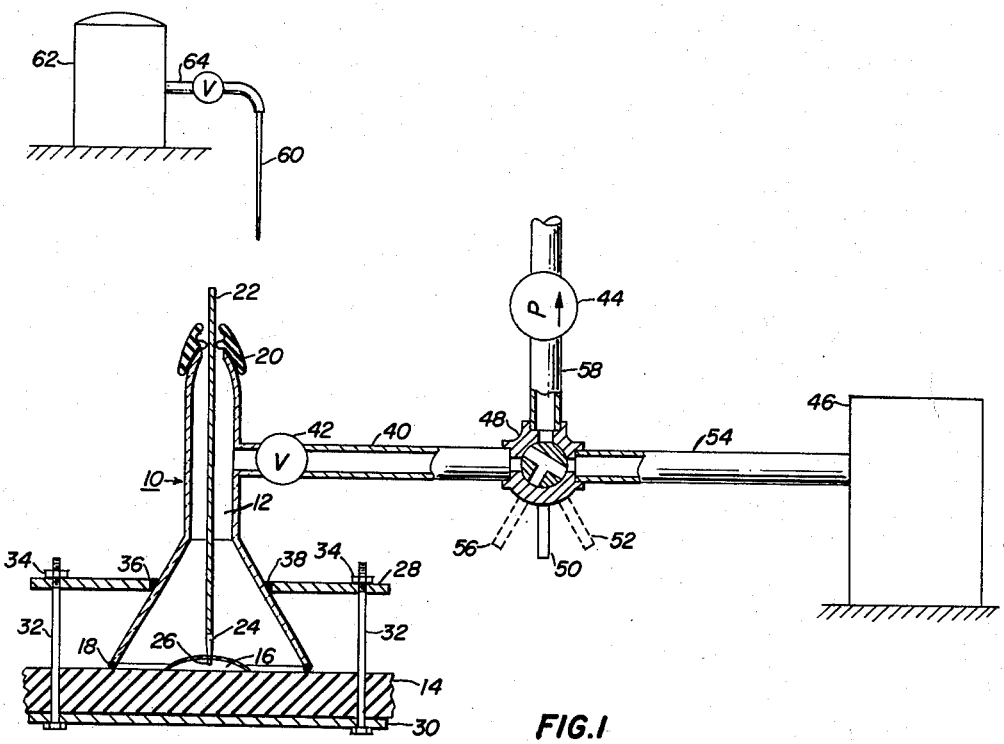

June 1, 1965  K. P. YATES ETAL  3,186,232
APPARATUS FOR OBTAINING FLUID SAMPLES FROM BLISTERS
Filed May 28, 1962

INVENTORS
KENNETH P. YATES
BY ROBERT F. BUHL
MARION L. YEAGLE

ATTORNEY

3,186,232
APPARATUS FOR OBTAINING FLUID SAMPLES FROM BLISTERS

Kenneth P. Yates, Robert F. Buhl, and Marion L. Yeagle, Crystal Lake, Ill., assignors to The Pure Oil Company, Chicago, Ill., a corporation of Ohio
Filed May 28, 1962, Ser. No. 198,120
11 Claims. (Cl. 73—421.5)

This invention relates to a fluid sampling device and, more particularly, to an apparatus for obtaining samples of a gas or liquid adsorbed in or on the surface of solid materials or contained in subsurface cavities of solid materials.

In the interpretation of a phenomena that develop on or below the surface of solids such as rubber, metal, plastics, rocks and similar materials, it is sometimes necessary to obtain samples of gases or liquids adsorbed on the surface or trapped at some depth in these solids. Since the interpretation of such phenomena is achieved by analysis of the fluid samples, a preferred feature, if not an essential feature in some cases, of construction of an apparatus for obtaining the fluid samples is that it be so constructed that the samples remain free of contamination by atmospheric air. Examples of instances where the fluid samples must remain free of contamination by atmospheric air are when air may have the effect of reducing the concentration of important constituents of the sample to such a degree that the analysis is unreliable, the presence of air in the sample is to be determined, or impurities in the air, such as products of combustion, may lead to an erroneous analysis.

Although the apparatus of our invention is useful for obtaining samples of fluids adsorbed on or trapped below the surface of various solid materials, it is especially useful for obtaining samples of fluids in the cavities of motor vehicle tires. In order to determine which of several factors has caused a tire to blister, which occasionally happens, it is necessary to determine the composition of the fluid in the tire blister. A knowledge of the composition of the fluid in the blisters leads to better understanding and control of their formation. The contents of the blisters can be obtained without air contamination by the utilization of our invention for accurate analysis.

Briefly, the apparatus of our invention includes a fluid collecting member, or sampling bell, having an open end to engage the solid surface from which the sample is to be obtained, in a fluid-tight relationship, thereby sealing the portion of the solid from which the sample is to be obtained within the sampling chamber. The apparatus includes means for flushing the sampling chamber with an inert gas, such as helium, to displace air trapped in the chamber, thereby avoiding contamination of the fluid sample by atmospheric air. Samples of fluids adsorbed in the surface are obtained by evacuating the chamber in steps, and samples entrapped below the surface are removed by evacuating the chamber in steps and/or mechanically puncturing the surface to permit subsurface fluids to be released. Fluid samples thus obtained may then be analyzed by introducing same to a suitable analyzing device, such as a mass spectrometer.

Accordingly, the primary object of this invention is to provide a novel fluid-sampling device.

Another object of this invention is to provide an apparatus for obtaining samples of fluids adsorbed on or trapped in solid materials.

Still another object of this invention is to provide an apparatus for obtaining samples of fluids adsorbed on or trapped in solid materials, wherein the samples are maintained free from contamination by air.

A further object of this invention is to provide an apparatus for obtaining samples of fluids adsorbed on or trapped in solid materials, which apparatus includes means for evacuating the fluid sample collecting chamber and means for mechanically piercing the solid materials.

Figure 2:
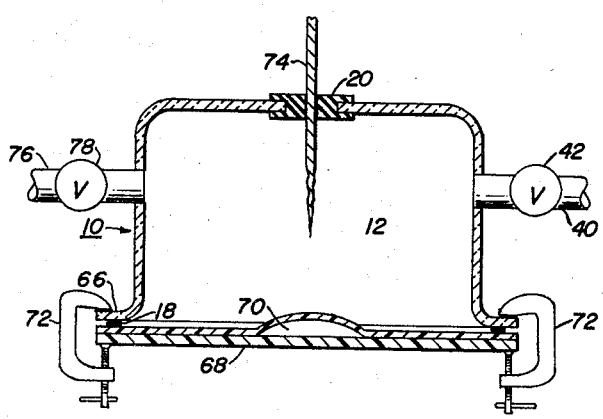

These and further objects of this invention will become apparent or be described as the description herein proceeds and reference is made to the accompanying drawings in which:

FIGURE 1 is an elevational view, partially in section and partially schematic, of one embodiment of the sampling chamber of this invention; and FIGURE 2 is an elevational view, partially in section and partially schematic, of a second embodiment of the fluid sampling chamber.

This invention is best described by reference to the accompanying drawings wherein like numerals of reference designate corresponding components in each of the drawings. Referring to FIGURE 1, the numeral 10 represents the fluid collecting member, or sampling bell, having fluid collecting chamber 12. Sampling bell 10 is preferably of glass or a transparent plastic for reasons which will become apparent in the description of the utilization of the apparatus. Acrylic polymers are especially useful as materials for sampling bell 10 in view of their crystal clarity, strength, and resistance to most chemicals. The open end of fluid collecting member 10 is sealed over solid specimen 14, which is a portion of a rubber tire sidewall, with blister 16 within collecting chamber 12. An O ring 18 of a resilient material, such as rubber, is provided to make collecting chamber 12 fluid tight. A rubber septum 20 is fitted over the top opening of sampling bell 10. Extending through septum 20 is needle 22 with opening 24 leading to hollow point 26.

The open end of sampling bell 10 is held in place against solid specimen 14 by pressure plates 28 and 30, which in turn are held in place by bolts 32 and nuts 34. Upper pressure plate 28 is provided with aperture 36, which bears against the conical surface of sampling bell 10. Upper pressure plate 28 is preferably provided with a rubber gasket 38 which protects the glass or plastic of sampling bell 10 from the adjacent metal part of upper pressure plate 28.

Communicating with sampling chamber 12 is conduit 40, controlled by valve 42. Conduit 40 is connected to suction pump 44 and fluid analysis device 46, such as a mass spectrometer, through three-way valve 48. As shown in FIGURE 1, handle 50 of valve 48 is in the neutral position. When handle 50 is placed in position 52, fluid in sampling chamber 12 flows through conduit 40, valve 48, and conduit 54 into spectrometer 46. When handle 50 is placed in position 56, fluid flowing through conduit 40 from the sampling chamber 12 enters conduit 58 and is exhausted to the atmosphere by means of pump 44.

In the preferred method of use of the apparatus of our invention, puncturing needle 22 is inserted through septum 20 and so positioned that hollow point 26 is well above the top surface of blister 16. Valve 42 is then closed and handle 50 of valve 48 turned to position 56, and suction pump 44 started to evacuate conduit 40.

After conduit 40 is substantially evacuated, handle 50 is turned to the neutral position and valve 42 is opened, resulting in a partial evacuation of sampling chamber 12. If the structure of blister 16 withstands the reduced pressure in sample chamber 12, the pressure in sample chamber 12 is reduced further by repeating the above process until the surface structure of blister 16 bursts or until it is found to remain intact under a substantially high vacuum, as for example when the pressure in sample chamber 12 is about 1 micron of mercury. If the surface structure of blister 16 fails under the reduced pressure, the fluid in blister 16 will be trapped in sample chamber 12 and conduit 40. The fluid sample thus obtained may then be introduced into mass spectrometer 46 for obtaining a spectrum by turning handle 50 to position 52.

If the structure of blister 16 withstands the severely reduced pressure, puncturing needle 22 is moved down through the surface of blister 16 until it penetrates blister 16 in such a position that gas or liquid from blister 16 is permitted to move through hollow point 26 of needle 22 and out hole 26 into sample chamber 12. With valve 42 open and handle 50 of valve 48 turned to position 52, the fluid sample may flow into spectrometer 46.

As hereinbefore mentioned, there will be certain instances where it is highly desirable that the fluid samples obtained by our invention be substantially free of contamination by atmospheric air. In such an instance, hollow needle 60, having a longitudinal opening extending therethrough, and connected to inert gas source 62 by valve-controlled conduit 64, may be utilized. The sampling procedure is preceded by inserting needle 60 through septum 20 and flushing sample chamber 12 with an inert gas, such as helium, from source 62 with valve 42 open and handle 50 of three-way valve 48 in position 56. The flushing is allowed to take place until substantially all air in sample chamber 12 is displaced by the inert gas, whereupon valve 42 is closed. Hollow needle 60 is then removed from septum 20 and replaced with needle 22, after which the hereinbefore described sampling procedure takes place.

Referring to FIGURE 2, wherein an alternative embodiment of the fluid sampling chamber is illustrated, sampling bell 10 is formed with outwardly extending lip 66 adjacent the open end thereof. As in the embodiment illustrated in FIGURE 1, lip 66 is provided with a resilient sealing member 18 so that sampling bell 10 will engage solid specimen 68 in fluid-tight relationship. Solid specimen 68 from which the fluid sample is to be obtained is a laminated plastic sheet having blister 70 between the two layers thereof. Sampling bell 10 is held in place by C-clamps 72. Means for puncturing the blister is drill 74 together with means, not shown, for rotating it to pierce the surface of blister 70. Sampling bell 10 is provided with a second conduit 76 controlled by valve 78 for admitting an inert flushing gas into chamber 12. The procedure for obtaining a sample from solid specimen 68 is the same as the procedure described in relation to FIGURE 1, except drill 74 is preferably raised after it has punctured the surface of blister 70.

Although this invention has been described in relation to specific embodiments, modifications can be made without departing from the intended scope of this invention. For example, while the sampling device of our invention is particularly suitable for taking samples to be analyzed by mass spectrometry, the samples obtained may be analyzed by other means, such as infrared spectrometry, gas chromatography, etc. A variety of other clamping devices, such as magnetic clamps, may be used for holding the sampling bell to the solid specimen. In the embodiment illustrated in FIGURE 1, a hollow needle with suitable valve-control means can be used both for admitting a flushing gas into the sampling chamber and puncturing the surface of the solid specimen. Surface adsorbed gas samples may be obtained by this device without using the piercing means.

The embodiments of this invention in which an exclusive property or privilege is claimed are defined as follows:

1. An apparatus for obtaining fluid samples from a solid material which consists in an open-ended fluid collecting member, said fluid collecting member being capable of withstanding sub-atmospheric pressure without substantially deforming, the open end being adapted to engage said solid material in fluid-tight relationship, thereby sealing a portion of said solid material within said fluid collecting member from the ambient atmosphere, means for holding said open end against said solid material, means for piercing the surface of said solid material sealed within said fluid collecting member, and valve-controlled conduit means connecting the interior of said fluid collecting member to a fluid analyzing means.

2. An apparatus in accordance with claim 1 in which said fluid collecting member is provided with resilient sealing means around the open end thereof to engage said solid material in fluid-tight relationship.

3. An apparatus in accordance with claim 2 which includes means for introducing a gas into the interior of said fluid collecting member.

4. An apparatus in accordance with claim 3 in which said means for introducing a gas into the interior of said fluid collecting member is a second valve-controlled conduit means.

5. An apparatus in accordance with claim 3 in which said holding means includes a pair of spaced pressure plates biasing said fluid collecting member and solid material toward each other, and means for forcing said pressure plates toward each other.

6. An apparatus in accordance with claim 3 which includes means for evacuating said fluid collecting member to reduce the pressure therein.

7. An apparatus in accordance with claim 6 in which said valve-controlled conduit means includes said evacuating means and means for analyzing said fluid samples.

8. An apparatus in accordance with claim 3 in which said fluid-collecting member is provided with an outwardly extending lip adjacent the open end thereof.

9. An apparatus for obtaining fluid samples from a solid material comprising an open-ended fluid collecting member provided with resilient sealing means around the open end thereof to engage said solid material in fluid-tight relationship, thereby sealing a portion of said solid material within said fluid collecting member from the ambient atmosphere, said fluid collecting member being capable of withstanding sub-atmospheric pressures without substantially deforming, valve-controlled conduit means connected to the interior of said fluid collecting member and including means for introducing a gas into said fluid collecting member, means for evacuating said fluid collecting member and to connect to a fluid analyzing means, and holding means for biasing said solid material and fluid collecting member toward each other.

10. An apparatus in accordance with claim 9 in which said fluid collecting member includes means for mechanically piercing the surface of said solid material sealing within said fluid collecting member.

11. An apparatus for obtaining fluid samples from a solid material containing same comprising an open-ended fluid collecting member, frusto-conical in shape, the open end thereof having a circumferential resilient sealing means to engage said solid material in fluid-tight relationship, thereby sealing a portion of said solid material within said fluid collecting member from the ambient atmosphere; a pair of spaced pressure plates, one of which has a central opening, the periphery of which registers with at least a portion of the frusto-conical wall of said fluid collecting member the other plate adapted to engage at least a portion of said solid material whereby at least a portion of said solid material is disposed between said plates; means for forcing said pressure plates toward each other thereby biasing said fluid collecting member and said solid material toward each other; and means for introducing a gas into the interior of said fluid collecting member.

References Cited by the Examiner

UNITED STATES PATENTS

| | | | |
|---|---|---|---|
| 2,295,817 | 9/42 | Winther | 128—300 X |
| 2,971,369 | 2/61 | Danaczko et al. | 73—19 |
| 3,038,490 | 6/62 | Yocum | 137—318 |
| 3,067,619 | 12/62 | Fielding | 73—421.5 |

FOREIGN PATENTS 950,614   10/56   Germany.

RICHARD C. QUEISSER, *Primary Examiner.*

JOSEPH P. STRIZAK, *Examiner.*